(12) United States Patent
Qin et al.

(10) Patent No.: US 11,330,812 B2
(45) Date of Patent: May 17, 2022

(54) MOSQUITO TRAPPING DEVICE

(71) Applicant: Foshan GreenYellow Electric Technology Co., Ltd., Guangdong (CN)

(72) Inventors: Xinzong Qin, Guangdong (CN); Ruofei Wang, Guangdong (CN); Keke Hu, Guangdong (CN)

(73) Assignee: Foshan GreenYellow Electric Technology Co., Ltd., Foshan (CN)

( * ) Notice: Subject to any disclaimer, the term of this patent is extended or adjusted under 35 U.S.C. 154(b) by 175 days.

(21) Appl. No.: 16/666,382

(22) Filed: Oct. 28, 2019

(65) Prior Publication Data
US 2021/0045377 A1 Feb. 18, 2021

(30) Foreign Application Priority Data
Aug. 16, 2019 (CN) .......................... 201910757895.6

(51) Int. Cl.
| *A01M 1/02* | (2006.01) |
| *A01M 1/10* | (2006.01) |
| *A01M 1/06* | (2006.01) |
| *A01M 1/20* | (2006.01) |

(52) U.S. Cl.
CPC .............. *A01M 1/023* (2013.01); *A01M 1/06* (2013.01); *A01M 1/106* (2013.01); *A01M 1/2094* (2013.01); *A01M 2200/012* (2013.01)

(58) Field of Classification Search
CPC .... A01M 1/2094; A01M 1/023; A01M 1/106; A01M 1/02; A01M 1/22; A01M 2200/012
See application file for complete search history.

(56) References Cited

U.S. PATENT DOCUMENTS

| 3,480,373 | A | * | 11/1969 | Talbot .................... | F04D 29/34 |
| | | | | | 416/226 |
| 11,197,472 | B1 | * | 12/2021 | Favor, III ............. | A01M 1/023 |
| 11,241,003 | B2 | * | 2/2022 | Li ........................... | A01M 1/08 |
| 2003/0131525 | A1 | * | 7/2003 | Bertani ................... | A01M 1/08 |
| | | | | | 43/139 |

(Continued)

FOREIGN PATENT DOCUMENTS

| CN | 104719268 A | * | 6/2015 | ............ A01M 1/08 |
| CN | 105900953 A | * | 8/2016 | |

(Continued)

*Primary Examiner* — Darren W Ark
*Assistant Examiner* — Kari A Bradberry (57) ABSTRACT

The present invention provides a mosquito trapping device, which comprises a carbon dioxide generating module, a temperature control module, a humidity control module, and a mosquito-killing module. The carbon dioxide generating module comprises a container A and a container B, a solution in the container A reacts with a solution in the container B to generate carbon dioxide; the temperature control module controls a temperature of the mosquito trapping device to be between 38° C. and 45° C.; the humidity control module controls humidity of the mosquito trapping device to be between 50% and 80%; the mosquito-killing module generates a guiding wind having a wind speed of 0.7 m/s to 15 m/s. The present invention has a good mosquito-attracting effect and a desirable mosquito-killing ability.

17 Claims, 7 Drawing Sheets

(56) References Cited

U.S. PATENT DOCUMENTS

| | | | | |
|---|---|---|---|---|
| 2005/0126068 A1* | 6/2005 | Welch | ................... | A01M 1/023 43/112 |
| 2005/0210735 A1* | 9/2005 | Harmer | ................ | A01M 1/106 43/107 |
| 2008/0008636 A1* | 1/2008 | Coler | .................... | A01N 59/04 422/305 |
| 2010/0287816 A1* | 11/2010 | Abelbeck | ............. | A01M 1/023 43/113 |
| 2014/0322360 A1* | 10/2014 | Rose | ....................... | A01M 1/06 424/700 |
| 2016/0128314 A1* | 5/2016 | Hauptmann | .......... | A01M 1/023 43/125 |
| 2017/0231210 A1* | 8/2017 | Lillamand | .............. | A01M 1/06 43/107 |
| 2019/0174736 A1* | 6/2019 | Smith | ................... | A01M 1/145 |
| 2020/0396975 A1* | 12/2020 | Furuta | ................... | A01M 1/223 |

FOREIGN PATENT DOCUMENTS

| | | | | |
|---|---|---|---|---|
| CN | 107182967 A | * | 9/2017 | ................ F21V 1/00 |
| CN | 209333514 U | * | 9/2019 | |
| CN | 110537534 A | * | 12/2019 | ............ A01M 1/023 |
| CN | 211129494 U | * | 7/2020 | ............ A01M 1/023 |
| FR | 3006855 A1 | * | 12/2014 | ............ A01M 1/023 |
| WO | WO-2013183754 A1 | * | 12/2013 | ........... A01M 7/0003 |
| WO | WO-2018017982 A1 | * | 1/2018 | ............ A01M 1/106 |
| WO | WO-2019151072 A1 | * | 8/2019 | .............. A01M 1/14 |

* cited by examiner

MOSQUITO TRAPPING DEVICE

CROSS REFERENCE TO RELATED APPLICATIONS

The present application claims the benefit of Chinese Patent Application No. 201910757895.6 filed on Aug. 16, 2019, the contents of which are incorporated herein by reference in their entirety.

FIELD OF THE INVENTION

The invention relates to the field of insect trapping, in particular to a mosquito trapping device.

BACKGROUND OF THE INVENTION

According to statistics, there are more than 2,000 kinds of mosquitoes on earth, among them more than 200 kinds reside in China. There are three main genera of mosquitoes that may harm humans: *Anopheles, Culex,* and *Aedes.* Existing mosquito traps generally employ UV lamps to generate specific wavelengths of light to attract and kill mosquitoes. However, the aforementioned light-trapping method has its limitations: it is limited by space and obstacles; any portion of the mosquito trap blocked by obstacles would not be able to attract mosquitoes, undermining the overall mosquito trapping ability.

According to scientific research, mosquitoes track the location of human beings not through vision, but by carbon dioxide exhaled, the smell of human sweat, and heat. Mosquito trapping needs to take the habits of mosquitoes into account to achieve desirable results.

SUMMARY OF THE INVENTION

The objective of the present invention is to provide a mosquito trapping device that has good mosquito attracting abilities, a simple structure, and is easy to use.

To achieve the aforementioned objective, the present invention provides a mosquito trapping device, which comprises a carbon dioxide generating module, a temperature control module, a humidity control module, and a mosquito-killing module; the carbon dioxide generating module, the temperature control module, and the humidity control module attract mosquitoes, then the mosquitoes are lured into the mosquito trapping device via the mosquito-killing module and are air-dried and dehydrated to death;

wherein the carbon dioxide generating module comprises a container A and a container B, a solution in the container A reacts with a solution in the container B to generate carbon dioxide;

the temperature control module controls a temperature of the mosquito trapping device to be between 38° C. and 45° C.; the temperature changes within a preset range over a preset time;

the humidity control module controls the humidity of the mosquito trapping device to be between 50% and 80%;

the mosquito-killing module generates a guiding wind having a wind speed of 0.7 m/s to 15 m/s, the wind speed changes within a preset amplitude over a preset time.

As an improvement of the technical solution above, the carbon dioxide generating module comprises the container A and the container B, the container A contains citric acid and water, the container B contains sodium hydrogen carbonate and water, a weight ratio of the citric acid to water is (1-2):(1-2), a weight ratio of the sodium hydrogen carbonate to water is (1-2):(1-2), and a weight ratio of the citric acid to the sodium hydrogen carbonate is (1-2):(1.1-3).

As an improvement of the technical solution above, the carbon dioxide generating module comprises the container A and the container B, the container A contains citric acid and water, the container B contains sodium hydrogen carbonate and water, the weight ratio of the citric acid to water is 1:1, the weight ratio of the sodium hydrogen carbonate to water is 1:1, and the weight ratio of the citric acid to the sodium hydrogen carbonate is 1:1.2.

As an improvement of the technical solution above, a flow rate of the carbon dioxide generated by the carbon dioxide generating module is between 20 ml/min and 200 ml/min.

As an improvement of the technical solution above, the carbon dioxide generating module comprises the container A and the container B, the container A and the container B are connected by a conduit, the container A is provided with an intake passage, an air pump is connected to the intake passage; the container B is provided with an exhaust passage and a drainage passage; the exhaust passage is connected to a carbon dioxide exhaust port and a carbon dioxide exhaust observation window.

As an improvement of the technical solution above, the intake passage is provided with a one-way valve; the conduit connecting the container A and the container B is provided with a one-way valve; an exhaust solenoid valve is provided between the exhaust passage and the carbon dioxide exhaust port and the carbon dioxide exhaust observation window; the drainage passage is provided with a drainage solenoid valve.

As an improvement of the technical solution above, the temperature control module controls the temperature of the mosquito trapping device to be between 38° C. and 43° C., and the temperature changes within a range of ±(0.05-0.5)° C. over 1 s-5 s.

As an improvement of the technical solution above, the humidity control module controls the humidity of the mosquito trapping device to be between 60% and 80%.

As an improvement of the technical solution above, the mosquito-killing module generates a guiding wind having a wind speed of 0.7 m/s to 8 m/s, the wind speed changes within an amplitude of ±(1-3) m/s over 5 s to 10 s.

As an improvement of the technical solution above, the mosquito-killing module includes a fan, a wind director, and a mosquito storage box;

the fan includes a plurality of blades and a wheel hub; the plurality of blades are disposed on an outer peripheral wall of the wheel hub and are circumferentially spaced from one another along the wheel hub; a gap between adjacent blades is 1/(2-3) of a width of a blade, an angle of inclination between the blade and the wheel hub is 45°-60°; the wheel hub is provided with a plurality of through-holes;

the mosquito storage box includes a mosquito storage net and an escape prohibiting funnel.

Comparing with the prior art, the beneficial effects of the present application are as follows:

1. The present invention includes a carbon dioxide generating module, a temperature control module, a humidity control module, and a mosquito-killing module, wherein the carbon dioxide generating module generates carbon dioxide; the temperature control module controls the temperature to be between 38° C. and 45° C., and changes periodically; the humidity control module controls humidity. The carbon dioxide generating module, the temperature control module, and the humidity control module collaborate to simulate human breathing to maximize mosquito trapping. The mosquitoes are then lured into the mosquito trapping device through the mosquito-killing module and are air-dried to death. The present invention has desirable mosquito-attracting and desirable mosquito-killing abilities. Furthermore, the present invention displays a good mosquito-killing ability towards different kinds of mosquitoes.

2. The invention generates carbon dioxide by reacting an aqueous solution of citric acid with a sodium hydrogen carbonate solution. The raw materials come from diverse sources, have a long shelflife, and are neither toxic nor harmful. Thus, it is convenient to use the raw materials on a daily basis and they do not pollute the environment.

3. The carbon dioxide generating module is provided with a one-way valve and a solenoid valve, which can automatically control the working time, the carbon dioxide emission, and the change of carbon dioxide emission of the mosquito trapping device. This allows the device to meet operational requirements in different regions, different seasons, and different applications, providing flexibility and a wide application range.

4. Mosquitoes detect their targets by the temperature of the human body, humidity, and the odorous chemicals released by the human body. The present invention takes the habits of mosquitoes into account: the temperature of the mosquito trapping device is controlled by the temperature control module to be within 38° C.-43° C. and changes within a range of ±(0.05-0.5)° C. over 1 s-5 s; the humidity is controlled by the humidity control module to be 60%-80%; the carbon dioxide generated by the carbon dioxide generating module has a flow rate of 20 ml/min-200 ml/min. 80%-95% of the mosquitoes are attracted to the mosquito trapping device under the combined effect of the aforementioned three factors and the guiding wind with a wind speed of 0.7 m/s-8 m/s.

The present invention provides a mosquito-killing module, which comprises a fan, a wind director, and a mosquito storage box. The fan is provided with blades that are separated from each other by a gap and have a certain angle of inclination. Furthermore, a plurality of through-holes is provided in the wheel hub. These features increase the amount of wind blowing in the axial direction in the mosquito-killing module, which ensures that the mosquitoes can be quickly air-dried and dehydrated to death. Alternatively, the mosquitoes may suffer from dizziness that leads to death during their transfer. This prevents the escape of the mosquitoes, increasing the efficiency of mosquito killing.

DETAILED DESCRIPTION OF THE ILLUSTRATED EMBODIMENTS

To more clearly illustrate the aims, technical solutions, and beneficial effects of the present invention, the present invention is further described in detail below. It should be noted that the expressions "upper", "lower", "left", "right", "front", "back", "inside", and "outside" herein are only based on the accompanying drawings of the present invention and are not intended to limit the scope of the present invention.

Referring to FIGS. 1 to 4, the present embodiment discloses a mosquito trapping device, wherein a carbon dioxide generating module 1, a temperature control module 2, a humidity control module 3, and a mosquito-killing module 4 are provided in its casing. The carbon dioxide generating module 1, the temperature control module 2, and the humidity control module 3 attract the mosquitoes, then the mosquitoes are lured into the mosquito trapping device via the mosquito-killing module 4. Inside the mosquito-killing module 4, the mosquitoes are air-dried and dehydrated to death.

The ability of a mosquito to track its blood providers depends on its antennae and sensors on its three pairs of legs. The mosquitoes detect their targets according to the temperature, humidity, and odorous chemicals released by the human body. The heat-sensing part in their antennae can detect weak temperature fluctuations. Mosquitoes can accurately determine the locations of people and livestock a hundred meters away. Accordingly, the present invention devises a carbon dioxide generating module 1 to generate specific chemicals, a temperature control module 2 and a humidity control module 3 which control temperature and humidity respectively to maximize mosquito trapping.

Specifically, the carbon dioxide generating module 1 comprises a container A11, and a container B12. Carbon dioxide is generated by reacting the solutions in container A and container B. Preferably, container A11 contains an aqueous citric acid solution, container B12 contains a sodium hydrogen carbonate solution. The aqueous citric acid solution reacts with the sodium hydrogen carbonate solution to generate carbon dioxide. The carbon dioxide generated is discharged through a carbon dioxide discharge opening 10. The temperature control module 2 controls the temperature of the mosquito trapping device to be between 38° C. and 45° C.; the temperature changes at a preset range within a preset time. The humidity control module 3 controls the humidity of the mosquito trapping device to be between 50% and 80%.

Compared with odor, carbon dioxide causes the mosquitoes to fly faster and more directly against the wind. To optimize the carbon dioxide reaction device of the mosquito trapping device, and to coordinate with temperature and humidity control, the carbon dioxide flow rate of the present invention is 20 ml/min-200 ml/min. Compared to other flow rates, flow rates within this range are much more attractive to mosquitoes.

More preferably, to obtain the optimum mosquito attracting effect, the carbon dioxide generating module includes a flow control hole, which controls the flow rate of the carbon dioxide to be between 20 ml/min and 200 ml/min. It has been shown that within 100 meters, a carbon dioxide flow rate of 20 ml/min-200 ml/min is much more attractive to mosquitoes compared to other carbon dioxide flow rates. Furthermore, a carbon dioxide flow rate of 20 ml/min to 200 ml/min is easily attainable. The flow control hole has a diameter of 0.2 mm-0.6 mm; when operating together with a solenoid valve, it is possible to accurately control carbon dioxide emission without placing high requirements on the equipment of the carbon dioxide generating module.

Figure 5:
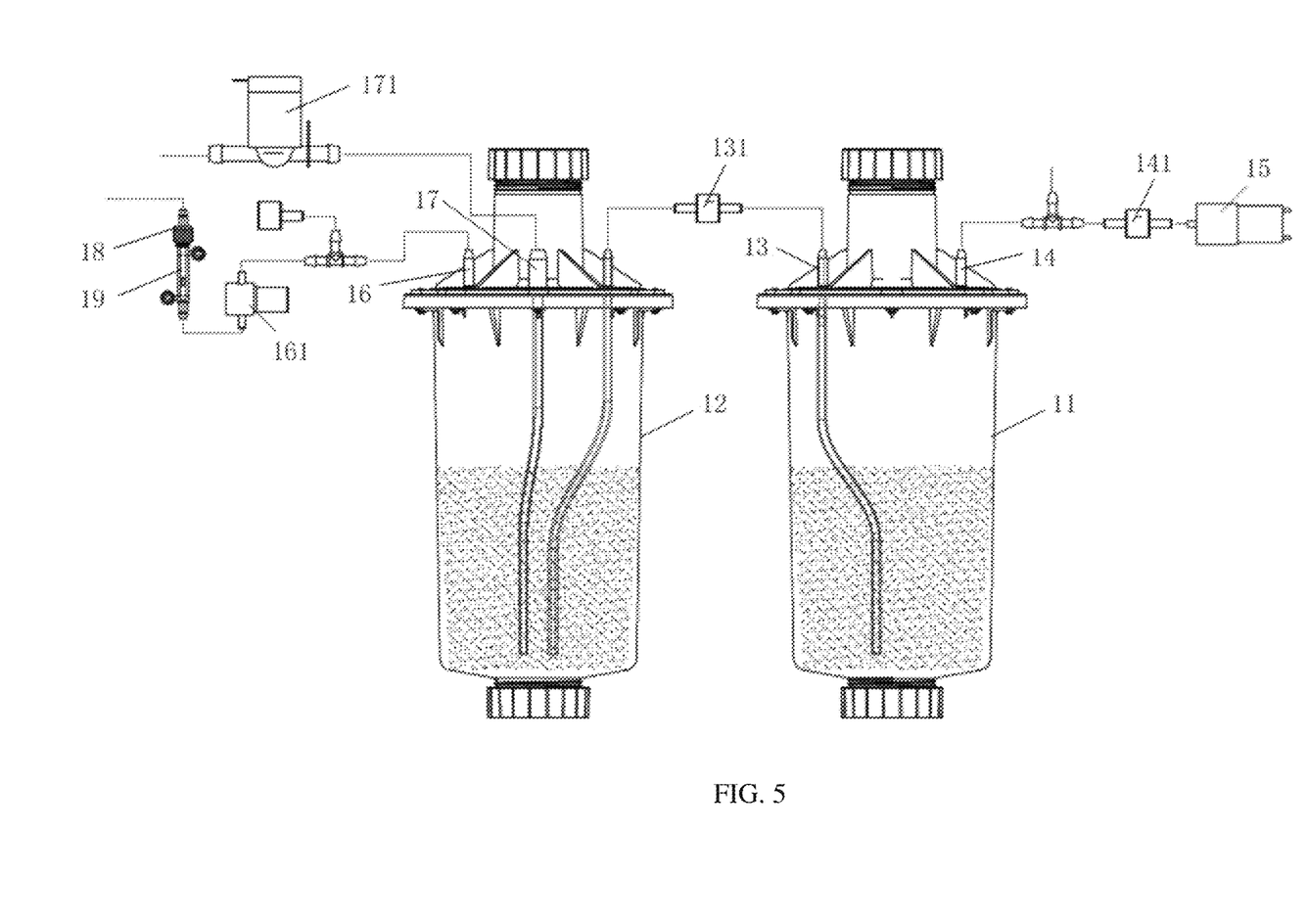
FIG. 5 is a schematic diagram of the carbon dioxide generating module shown in FIG. 1.

Preferably, referring to FIG. 5, the carbon dioxide generating module comprises container A11, which contains citric acid and water, and container B12, which contains sodium hydrogen carbonate and water. The weight ratio of citric acid to water is (1-2):(1-2), the weight ratio of sodium hydrogen carbonate to water is (1-2):(1-2), and the weight ratio of citric acid to sodium hydrogen carbonate is (1-2):(1.1-3).

In the present invention, citric acid and sodium hydrogen carbonate dissolve in water and react. By controlling the ratio of citric acid to water, the ratio of sodium hydrogen carbonate to water, and the ratio of citric acid to sodium hydrogen carbonate, the sodium hydrogen carbonate can fully react and prevent any residual solids from blocking the machine. Furthermore, the specific ratios allow the production of the largest amount of carbon dioxide required.

More preferably, the carbon dioxide generating module comprises container A11 containing citric acid and water, and container B12 containing sodium hydrogen carbonate and water. The weight ratio of citric acid to water is 1:1, the weight ratio of sodium hydrogen carbonate to water is 1:1, and the weight ratio of citric acid to sodium hydrogen carbonate is 1:1.2.

In the present invention, citric acid and sodium hydrogen carbonate dissolve in water and react. By controlling the ratio of citric acid to water to 1:1, the ratio of sodium hydrogen carbonate to water to 1:1, and the ratio of citric acid to sodium hydrogen carbonate to 1:1.2, the sodium hydrogen carbonate can fully react and prevent any residual solids from blocking the machine. Furthermore, the specific ratios allow the production of the largest amount of carbon dioxide required.

To better monitor the carbon dioxide emissions and to optimize the operational performance of the carbon dioxide generating module, the carbon dioxide generating module 1 comprises container A11 and container B12. Container A11 and container B12 are connected by a conduit 13. Container A11 is provided with an intake passage 14 to which an air pump 15 is connected. Container B12 is provided with an exhaust passage 16 and a drainage passage 17; the exhaust passage 16 is connected to a carbon dioxide exhaust port 18 and a carbon dioxide exhaust observation window 19. The carbon dioxide exhaust port 18 is provided with the flow control hole, which employs a solenoid valve to control the amount of carbon dioxide emitted.

The intake passage 14 is provided with a one-way valve 141 and an intake solenoid valve. The conduit 13 connecting container A11 and container B12 is provided with a one-way valve 131. An exhaust solenoid valve 161 is provided between the exhaust passage 16 and the carbon dioxide exhaust port 18 and the carbon dioxide exhaust observation window 19. The drainage passage 17 is provided with a drainage solenoid valve 171.

When a circuit control panel switch is pressed to start the air pump 15, the gas is introduced into the intake passage 14 through the one-way valve 141 to pressurize container A11 (meanwhile, the air pressure is detected by a pressure sensor that is linked to the control; when the pressure reaches a set value, the air pump is stopped). The liquid in container A11 passes through the one-way valve 131 and flows into container B12 through conduit 13; the two liquids are mixed and reacted to generate carbon dioxide gas. The exhaust solenoid valve 161 opens to release the gas at a set period as needed. After the two solutions are fully reacted, the waste liquid produced needs to be discharged to a sewage tank. A sewage control switch of the circuit control panel is pressed to starts the gas pump and the drainage solenoid valve 171. The waste liquid is discharged to the sewage tank by air pressure.

The invention adopts a one-way valve to avoid backflow of gas or liquid, which may disturb the normal operation of the device. The solenoid valve can automatically control intake time, intake amount, exhaust time, and exhaust amount, as well as drainage time and drainage amount. This ensures that the device can operate stably and meet mosquito-killing demands under different conditions.

Temperature is another key factor in attracting mosquitoes. The temperature control module 2 of the present invention controls the temperature of the mosquito trapping device to be between 38° C. and 43° C., and the temperature changes within a range of $\pm(0.05\text{-}0.5)°$ C. over 1 s-5 s. Preferably, the temperature control module 2 controls the temperature of the mosquito trapping device to be between 40° C. and 43° C., and the temperature changes within a range of $\pm(0.05\text{-}0.5)°$ C. over 1 s-5 s.

The temperature control module 2 controls the temperature to be between 38° C. and 43° C. A large number of experiments show that the temperature of the medium at the discharge opening reaches 37-40° C. after the temperature control module is turned on, which could better attract mosquitoes.

Furthermore, according to research, the heat-sensing part in the antennae of the mosquito can detect weak temperature fluctuations. The temperature control module 2 of the present invention controls the temperature so that it changes within a small range, thereby stimulating the heat-sensing part in the antennae of mosquitoes. This prompts the mosquitoes in a distance to determine the location of the mosquito trapping device, which in turn encourages a large number of mosquitoes to approach the air inlet 40.

Humidity is another important factor in attracting mosquitoes. The humidity control module 3 controls the humidity of the mosquito trapping device to be 50%-80%, as the mosquitoes are relatively active in this humidity range. Preferably, the humidity control module 3 controls the humidity of the mosquito trapping device to be between 60% and 80%.

It should be noted that the temperature control module and the humidity control module of the present invention can be any of the existing temperature controllers and humidifiers as long as they can adjust and control temperature and/or humidity.

The existing, simple carbon dioxide mosquito killers are less effective in killing mosquitoes because they are not able to attract mosquitoes continuously. The present invention optimizes the amount of carbon dioxide emitted to 20 ml/min-200 ml/min, which is much more attractive to the mosquitoes comparing with other emission amounts; however, this is still not ideal. Only with changing temperature and humidity control, which allows a continuous stimulation of the heat-sensing part in the antennae of mosquitoes through temperature fluctuation, is it possible to continuously attract mosquitoes and to increase the mosquito capture rate to 90-98%. Furthermore, in addition to *Anopheles, Culex,* and *Aedes,* this approach works for many different types of mosquitoes. To conclude, the present invention can be used to capture different types of mosquitoes; it has a broad application range and a desirable mosquito-capturing ability.

After the carbon dioxide generating module 1, the temperature control module 2, and the humidity control module 3 attract the mosquitoes to the air inlet 40, the mosquitoes are lured into the mosquito trapping device by the mosquito-killing module 4. In the mosquito trapping device, the mosquitoes are air-dried to death. Thus, generating wind that is able to quickly draw the mosquitoes into the device is also one of the key factors.

Figure 1:
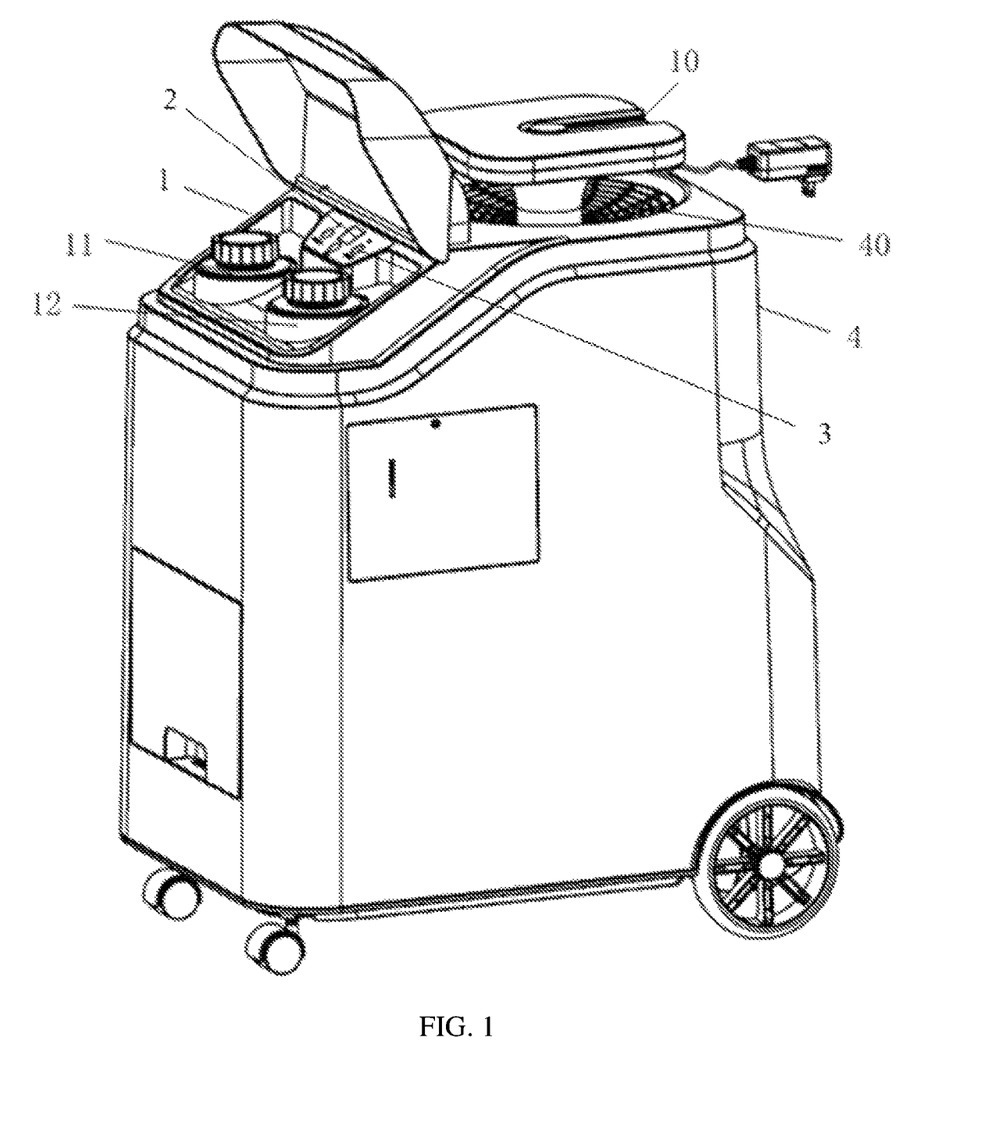
FIG. 1 is a schematic diagram of the mosquito trapping device of the present invention.
Figure 2:
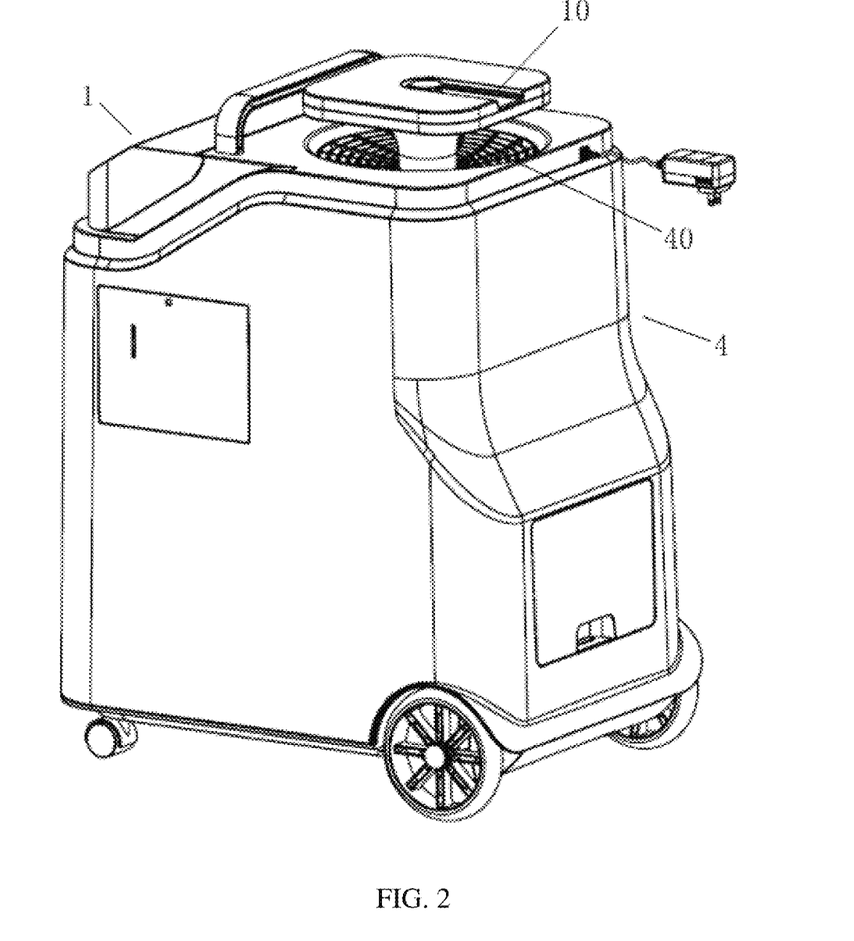
FIG. 2 is a schematic diagram of the mosquito trapping device shown in FIG. 1 from another perspective.
Figure 3:
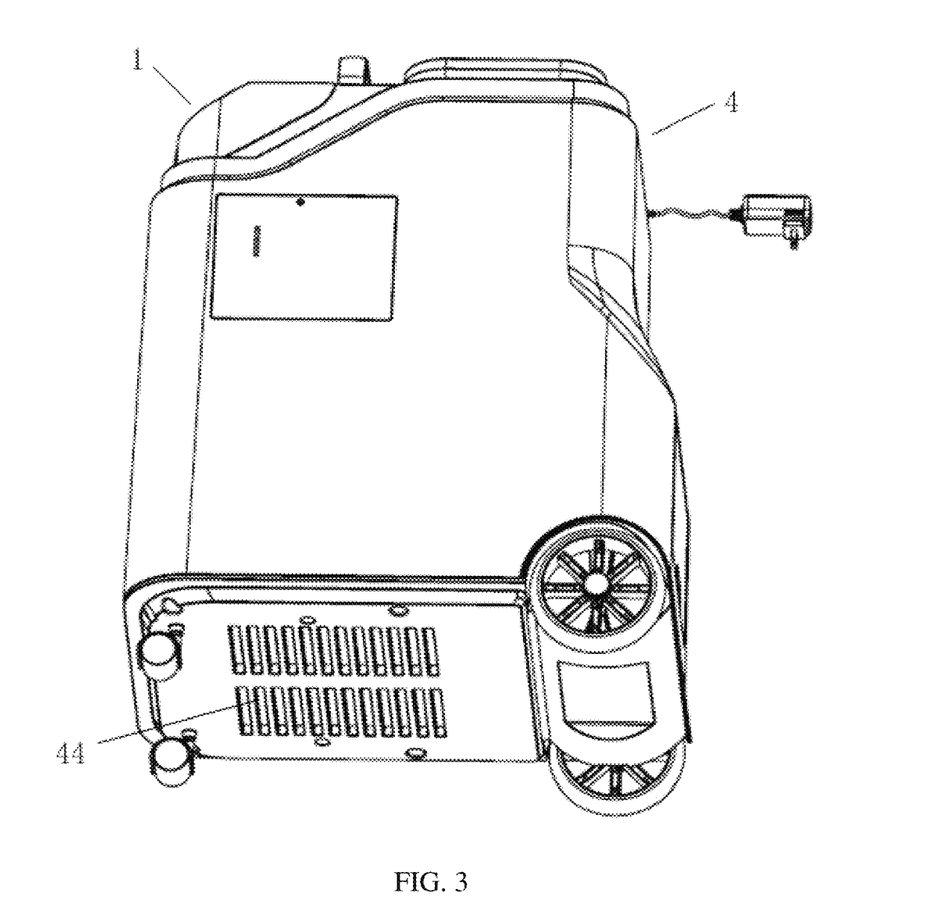
FIG. 3 is a schematic diagram of the mosquito trapping device shown in FIG. 1 from yet another perspective.
Figure 4:
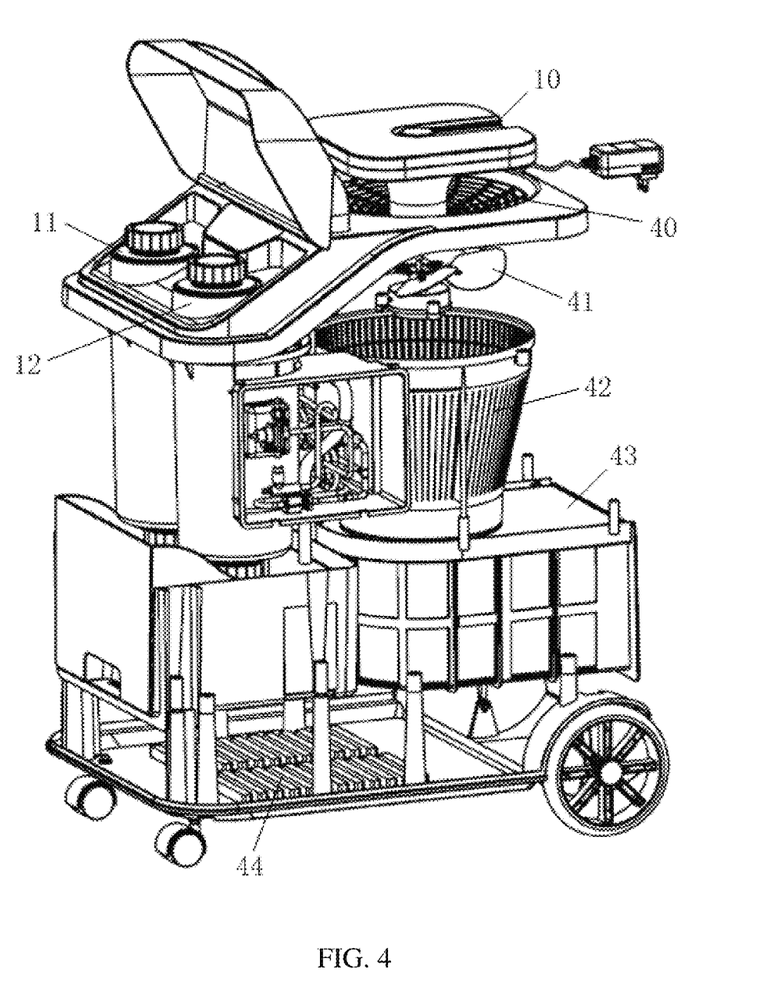
FIG. 4 is a schematic diagram showing the internal structure of the mosquito trapping device shown in FIG. 1.

The mosquito-killing module 4 generates a guiding wind having a wind speed of 0.7 m/s to 15 m/s, the wind speed changes within a preset amplitude over a preset time. The mosquito-killing module 4 includes a fan 41, a wind director 42, and a mosquito storage box 43. The fan is disposed at the air inlet 40, an air outlet 44 is provided at the bottom of the casing. Preferably, the mosquito-killing module 4 generates a guiding wind with a wind speed of 5 m/s to 15 m/s.

Wind is an important factor in killing mosquitoes. The mosquito-killing module 4 produces a guiding wind with a wind speed of 0.7 m/s-15 m/s. The wind can quickly suck mosquitoes from the air inlet 40 to the wind director 42 inside the device, then reaching the mosquito storage box 43 under the guiding wind. In addition, the present invention sets the guiding wind to vary in a small amplitude, which simulates the outdoor environment and assists the carbon dioxide generating module 1, the temperature control module 2, and the humidity control module 3 in attracting the mosquitoes to the air inlet 40.

Preferably, the mosquito-killing module 4 generates a guiding wind with a wind speed of 0.7 m/s to 8 m/s; the wind speed changes within an amplitude of ±(1-3) m/s over 5 s to 10 s. More preferably, the mosquito-killing module 4 generates a guiding wind with a wind speed of 5 m/s to 8 m/s; the wind speed changes within a range of ±(1-3) m/s over 5 s to 10 s.

The invention generates carbon dioxide gas through the carbon dioxide generating module 1, which attracts mosquitoes to the vicinity of the air inlet 40. The temperature control module 2 and the humidity control module 3 coordinates to simulate human breathing, thereby attracting the maximum number of mosquitoes to the air inlet 40. The fan 41 inside the device operates at a high speed to generate airflow from the air inlet 40 to the mosquito storage box 43; the mosquitoes near the air inlet 40 are sucked into the mosquito storage box 43 and air-dried to death. The present invention has a good mosquito-attracting ability and a desirable mosquito-killing ability.

Figure 6:
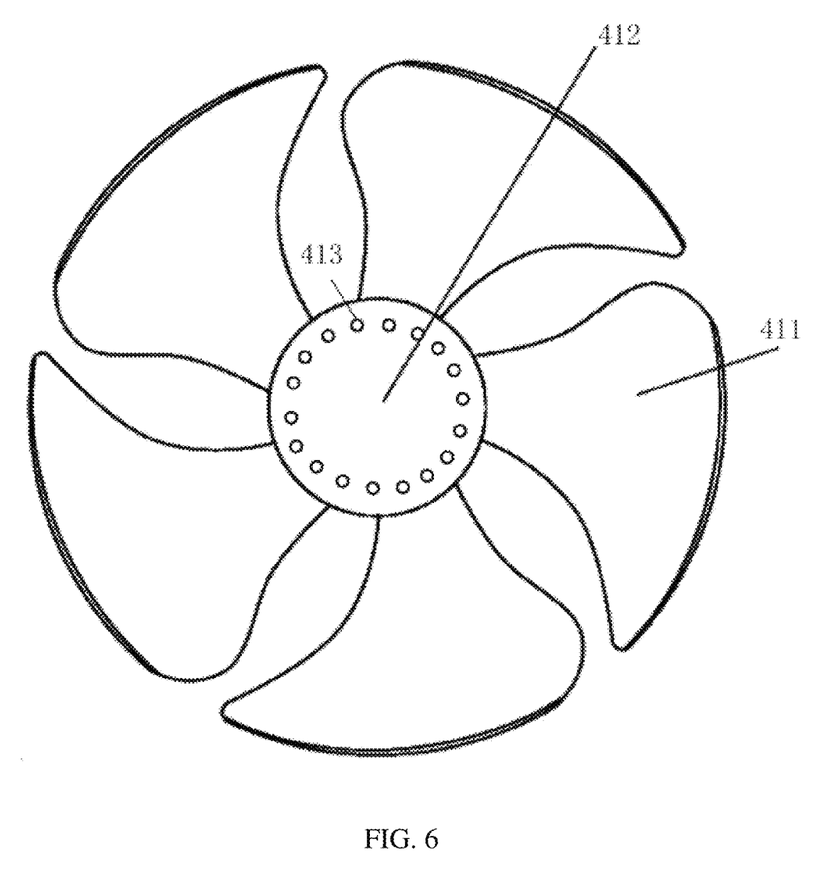
FIG. 6 is a schematic diagram of the fan shown in FIG. 1.
Figure 7:
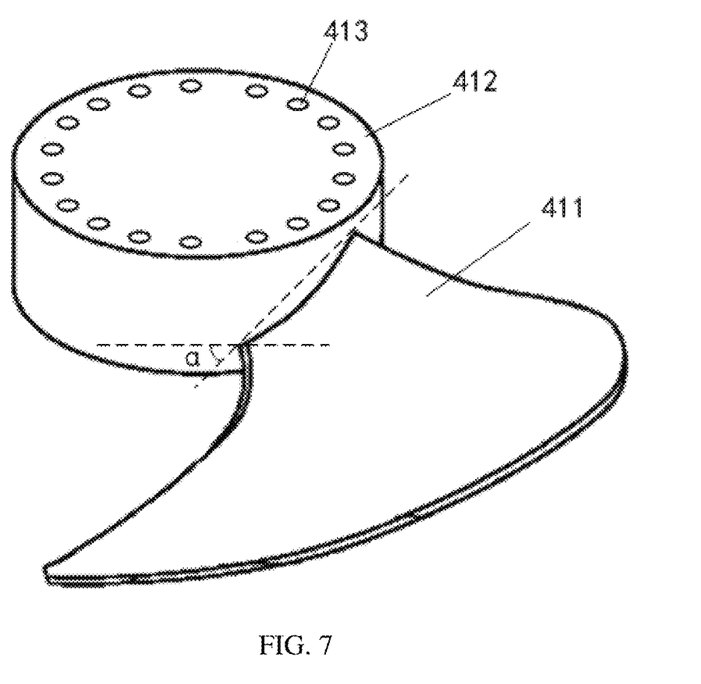
FIG. 7 is a schematic diagram of the blades of the fan shown in FIG. 6.

In order to increase mosquito-killing ability, the present invention optimizes the guiding wind generated by the mosquito-killing module 4. In particular, it increases the amount of wind blowing in the axial direction by altering the structure of the fan. Referring to FIG. 6, the fan 41 includes a plurality of blades 411 and a wheel hub 412. The plurality of blades 411 are disposed along the outer peripheral wall of the wheel hub 412 and are circumferentially spaced from one another on the wheel hub 412. The gap between adjacent blades 411 is 1/(2-3) of the blade width, and the angle of inclination α between the blade 411 and the wheel hub 412 is 45°-60° (as shown in FIG. 7). The wheel hub 412 is provided with a plurality of through-holes 413. Preferably, the diameter of the through-hole 413 is 0.5-3 mm. More preferably, the diameter of the through-hole 413 is 1-2 mm.

The fan is provided with blades that are separated from each other by a gap and have a certain angle of inclination. Furthermore, a plurality of through-holes is provided in the wheel hub. These features increase the amount of wind blowing in the axial direction in the mosquito-killing module, which ensures that the mosquitoes can be quickly air-dried and dehydrated to death. Alternatively, the mosquitoes may suffer from dizziness that leads to death during their transfer. This prevents the escape of the mosquitoes, increasing the efficiency of mosquito killing.

The mosquito storage box 43 includes a mosquito storage net and an escape prohibiting funnel (not shown in the drawings) to prevent mosquitoes in the mosquito storage box from escaping.

The working principle of the present invention is as follows:

The present invention starts the air pump 15 by controlling a switch. Gas is introduced into the intake passage 14 through the one-way valve 141 to pressurize container A11. The liquid in container A11 passes through one-way valve 131 and flows into container B12 through conduit 13. The two liquids mix and react to generate carbon dioxide.

At the same time, the temperature of the mosquito trapping device is controlled by the temperature control module 2 to be between 38° C. and 43° C., and the temperature changes within a range of ±(0.05-0.5)° C. over 1 s-5 s. The humidity of the mosquito trapping device is controlled by humidity control module 3 to be 60%-80% to attract mosquitoes to the vicinity of the air inlet 40.

Then, in order to kill the mosquitoes, the fan 41 inside the device operates at a high speed to generate airflow from the air inlet 40 to the mosquito storage box 43; the mosquitoes near the air inlet 40 are sucked into the mosquito storage box 43 through the wind director 42 and are air-dried to death. The mosquito storage box 43 can also be provided with a mosquito attracting agent to increase the mosquito killing efficacy of the mosquito trapping device.

The following are experiments on mosquito killing ability. These experiments are performed by varying carbon dioxide flow rates, temperatures, humidity, and wind speeds:

I. The parameters adopted by each example are shown in Table 1.

| Projects | Carbon dioxide flow rate | Temperature | Humidity | Wind speed |
|---|---|---|---|---|
| Example 1 | 20 mL/min | 38° C., changes at ± 0.05° C. within 1 s | 50% | 0.7 m/s, changes at ± 1 m/s within 5 s |
| Comparative example 1 | 20 mL/min | 25° C. | 50% | 0.7 m/s, changes at ± 1 m/s within 5 s |
| Example 2 | 50 mL/min | 42° C., changes at ± 0.1° C. within 2 s | 70% | 5 m/s, changes at ± 2 m/s within 8 s |
| Comparative example 2 | 50 mL/min | 43° C., changes at ± 0.1° C. within 2s | 40% | 5 m/s, changes at ± 2 m/s within 8 s |
| Example 3 | 100 mL/min | 43° C., changes at ± 0.2° C. within 1 s | 75% | 7 m/s, changes at ± 3 m/s within 10 s |
| Comparative example 3 | 100 mL/min | 42° C., changes at ± 0.2° C. within 1 s | 75% | 3 m/s |
| Example 4 | 150 mL/min | 43° C., changes at ± 0.3° C within 1 s | 80% | 8 m/s, changes at ± 1 m/s within 5 s |
| Comparative example 4 | 15 mL/min | 43° C., changes at ± 0.3° C.. within 1 s | 80% | 8 m/s, changes at ± 1 m/s within 5 s |
| Example 5 | 200 mL/min | 44° C., changes at ± 0.2° C. within 2 s | 65% | 10 m/s, changes at ± 1 m/s within 6 s |
| Comparative example 5 | 10 mL/min | 38° C. | 55% | 4 m/s |
| Example 6 | 100 mL/min | 42° C., changes at ± 0.2° C. within 1 s | 75% | 15 m/s, changes at ± 2 m/s within 5 s |
| Comparative example 6 | 100 mL/min | 42° C., changes at ± 0.2° C. within 1 s | 75% | A conventional fan, wind speed is 4 m/s |
| Example 7 | 200 mL/min | 42° C., changes | 70% | 7 m/s, changes |

-continued

| Projects | Carbon dioxide flow rate | Temperature | Humidity | Wind speed |
|---|---|---|---|---|
| Comparative example 7 | Not switched on | at ± 0.2° C. within 2 s Not switched on | | at ± 1 m/s within 6 s Not switched on |

It should be noted that examples 1-7 and comparative examples 1-5 all employ the fan described in the present invention, while comparative examples 6 and 7 employ a conventional fan.

II. The procedures for the experiments on mosquito-killing ability are as follows:

1. In a testing room (~100 square meters), place 10 pots of green plants of about 1.5 meters high and 16 pots of small plants. Open the windows of the room, the windows are provided with mosquito screens. The room simulates an outdoor environment.

2. Place 2 mosquito trapping devices in the room, plug the power supply into the mosquito trapping devices so that they are in normal operation mode. The mosquito trapping devices are distributed evenly in the room.

3. Set the parameters of the mosquito trapping devices according to the parameters specified in the table above. Each group of example-comparative example are tested simultaneously: set one mosquito trapping device with the parameters of the example, and the other mosquito trapping device with the parameters of the comparative example.

4. Allow a certain number of mosquitoes (300 female adult mosquitoes that are 3 to 5 days old and have not taken a blood meal) into the testing room and record the experimental conditions.

5. After 24 h, swap the positions of the mosquito trapping devices and record the number of mosquitoes captured. Replenish the number of mosquitoes in the testing room so that it is as consistent as possible with the initial number of mosquitoes 6. The experiment lasts for 35 days; the testing period for each group of example—comparative example is 5 days.

III. The results of the experiments on mosquito-killing ability are as follows:

The experiment temperature is 25-36° C. and the humidity is 52-78% during an experiment period of one month. The results are as follows.

| Projects | Mosquito capture rate |
|---|---|
| Example 1 | 41.4% |
| Comparative example 1 | 26.2% |
| Example 2 | 50.6% |
| Comparative example 2 | 41.2% |
| Example 3 | 59.8% |
| Comparative example 3 | 35.4% |
| Example 4 | 62.2% |
| Comparative example 4 | 35.4% |
| Example 5 | 79.6% |
| Comparative example 5 | 16.8% |
| Example 6 | 60.6% |
| Comparative example 6 | 35.4% |
| Example 7 | 96.8% |
| Comparative example 7 | 0.066% |

It should be noted that the mosquito capture rate in the table refers to the total mosquito capture rate over 5 days. The mosquito capture rate=the total number of mosquitoes captured/1500.

It can be concluded from the table above that when the temperature control module controls the temperature of the mosquito trapping device to be between 38° C. and 45° C. and the temperature changes within a range of ±(0.05-0.5)° C. over 1 s-5 s, the humidity control module controls the humidity of the trapping mosquito killer to be 60%-80%, and the flow rate of the carbon dioxide generated by the carbon dioxide generating module is 20 ml/min to 200 ml/min, 80%-95% of the mosquitoes are attracted to the mosquito trapping device under the combined effect of the aforementioned three factors and the guiding wind which has a wind speed of 0.7 m/s-15 m/s.

The above are the preferred embodiments of the invention. It should be noted that those skilled in the art can also make several improvements and refinements without departing from the principles of the invention. These improvements and refinements are considered to be within the scope of protection of the present invention.

What is claimed is:

1. A mosquito trapping device, comprising a carbon dioxide generating module, a temperature control module, a humidity control module, and a mosquito-killing module; wherein the carbon dioxide generating module, the temperature control module, and the humidity control module attract mosquitoes, then the mosquitoes are lured into the mosquito trapping device via the mosquito-killing module and are air-dried and dehydrated to death;
    wherein the carbon dioxide generating module comprises a container A and a container B, a solution in the container A reacts with a solution in the container B to generate carbon dioxide;
    wherein the temperature control module controls the temperature of the mosquito trapping device to be between 38° C. and 43° C., and the temperature changes within a range of ±0.05-0.5° C. over 1 s;
    the humidity control module controls humidity inside the mosquito trapping device to be between 50% and 80%;
    wherein the mosquito-killing module generates a guiding wind having a wind speed of 0.7 m/s to 8 m/s, the wind speed changes within an amplitude of ±1-3 m/s over 5 s to 10 s.

2. The mosquito trapping device according to claim 1, wherein the carbon dioxide generating module comprises the container A and the container B, the container A contains citric acid and water, the container B contains sodium hydrogen carbonate and water, a weight ratio of the citric acid to water is from 1:2 to 2:1, a weight ratio of the sodium hydrogen carbonate to water is from 1:2 to 2:1, and a weight ratio of the citric acid to the sodium hydrogen carbonate is from 1:3 to 2:1.1.

3. The mosquito trapping device according to claim 2, wherein the weight ratio of the citric acid to water is 1:1, the weight ratio of the sodium hydrogen carbonate to water is 1:1, and the weight ratio of the citric acid to the sodium hydrogen carbonate is 1:1.2.

4. The mosquito trapping device according to claim 1, wherein the carbon dioxide generating module includes a flow control hole, which controls a flow rate of the carbon dioxide to be between 20 ml/min and 200 ml/min.

5. The mosquito trapping device according to claim 4, wherein the flow control hole has a diameter of 0.2 mm-0.6 mm.

6. The mosquito trapping device according to claim 4, wherein the carbon dioxide generating module comprises the container A and the container B, the container A and the container B are connected by a conduit, the container A is provided with an intake passage, an air pump is connected to the intake passage; the container B is provided with an exhaust passage and a drainage passage; the exhaust passage is connected to a carbon dioxide exhaust port and a carbon dioxide exhaust observation window.

7. The mosquito trapping device according to claim 6, wherein the intake passage is provided with a one-way valve; the conduit connecting the container A and the container B is provided with a one-way valve; an exhaust solenoid valve is provided between the exhaust passage and the carbon dioxide exhaust port and the carbon dioxide exhaust observation window; the drainage passage is provided with a drainage solenoid valve.

8. The mosquito trapping device according to claim 1, wherein the humidity control module controls the humidity inside the mosquito trapping device to be between 60% and 80%.

9. The mosquito trapping device according to claim 1, wherein the mosquito-killing module includes a fan, a wind director, and a mosquito storage box;

the fan includes a plurality of blades and a wheel hub; the plurality of blades are disposed along an outer peripheral wall of the wheel hub and are circumferentially spaced from one another on the wheel hub; a gap between adjacent blades is from ½ to ⅓ of a width of a blade, an angle of inclination between the blade and the wheel hub is 45°-60°; the wheel hub is provided with a plurality of through-holes.

10. The mosquito trapping device according to claim 2, wherein the carbon dioxide generating module includes a flow control hole, which controls a flow rate of the carbon dioxide to be between 20 ml/min and 200 ml/min.

11. The mosquito trapping device according to claim 3, wherein the carbon dioxide generating module includes a flow control hole, which controls a flow rate of the carbon dioxide to be between 20 ml/min and 200 ml/min.

12. The mosquito trapping device according to claim 10, wherein the flow control hole has a diameter of 0.2 mm-0.6 mm.

13. The mosquito trapping device according to claim 11, wherein the flow control hole has a diameter of 0.2 mm-0.6 mm.

14. The mosquito trapping device according to claim 10, wherein the carbon dioxide generating module comprises the container A and the container B, the container A and the container B are connected by a conduit, the container A is provided with an intake passage, an air pump is connected to the intake passage; the container B is provided with an exhaust passage and a drainage passage; the exhaust passage is connected to a carbon dioxide exhaust port and a carbon dioxide exhaust observation window.

15. The mosquito trapping device according to claim 11, wherein the carbon dioxide generating module comprises the container A and the container B, the container A and the container B are connected by a conduit, the container A is provided with an intake passage, an air pump is connected to the intake passage; the container B is provided with an exhaust passage and a drainage passage; the exhaust passage is connected to a carbon dioxide exhaust port and a carbon dioxide exhaust observation window.

16. The mosquito trapping device according to claim 14, wherein the intake passage is provided with a one-way valve; the conduit connecting the container A and the container B is provided with a one-way valve; an exhaust solenoid valve is provided between the exhaust passage and the carbon dioxide exhaust port and the carbon dioxide exhaust observation window; the drainage passage is provided with a drainage solenoid valve.

17. The mosquito trapping device according to claim 15, wherein the intake passage is provided with a one-way valve; the conduit connecting the container A and the container B is provided with a one-way valve; an exhaust solenoid valve is provided between the exhaust passage and the carbon dioxide exhaust port and the carbon dioxide exhaust observation window; the drainage passage is provided with a drainage solenoid valve.

* * * * *